Patented Dec. 5, 1933

1,938,011

UNITED STATES PATENT OFFICE 1,938,011

MANUFACTURE OF RUBBER AND THE LIKE

Mario Faldini, Milan, Italy, assignor to Societá Italiana Pirelli, Milan, Italy

No Drawing. Application September 4, 1930, Serial No. 479,806, and in Italy September 13, 1929

7 Claims. (Cl. 134—17)

The present invention is for improvements in and relating to the manufacture of rubber and the like, and has particular reference to the manufacture of objects of rubber and the like direct from aqueous rubber and like dispersions according to the principle of the invention forming the subject of the application for U. S. A. Letters Patent No. 1,717,248.

It is known that oxygenated alicyclic compounds such as alicyclic alcohols and ketones, of which cyclohexanol, methylcyclohexanol, cyclohexanone, and their homologues are examples, although themselves insoluble in water, can be dispersed in water by aid of suitable dispersing agents, for instance, aqueous solutions of soap or saponin, and that the dispersions so obtained have emulsifying properties and can effect the emulsification of substances normally immiscible with water, such as benzene, gasoline, fats, and the like.

Now it has been found that the emulsifying property possessed by dispersions of the kind described may be applied to indiarubber and the like, so that aqueous dispersions of rubber and the like may be obtained which are adaptable to numerous applications, either by themselves or in admixture with other dispersions, in particular with natural aqueous dispersions of rubber or the like, for example, rubber latex or vulcanized rubber latex.

The present invention provides a composition of matter, suitable for the direct manufacture of articles of rubber or the like, which consists essentially of an emulsion of rubber or the like in an aqueous dispersion of an oxygenated alicyclic compound, for example, an alicyclic alcohol or ketone, such as cyclohexanol or cyclohexanone or homologue thereof. Mixtures of these organic emulsifiers may be used.

Said composition may consist essentially of globules of rubber or the like emulsified with a dispersion as aforesaid of an oxygenated alicyclic compound dispersed in an aqueous solution of a water-miscible colloid such as soap or saponin.

The plastic component of said composition may consist of suspended globules of natural or synthetic raw rubber, reclaimed rubber, vulcanized rubber, balata, guttapercha and the like, or mixtures of two or more of these.

A feature of the invention consists in a composition as aforesaid characterized by the presence of a naturally aqueous dispersed rubber or the like, for example, rubber latex or vulcanized rubber latex.

A composition according to this invention may be employed for the manufacture of articles of rubber of diverse kinds which may be vulcanized or not and may be of soft or hard rubber or ebonite.

It has been found, for instance, that such a composition may be advantageously employed for the direct manufacture of articles of rubber or the like according to the processes of the prior U. S. A. Letters Patent Nos. 1,579,169; 1,717,248; and 1,750,540; and applications Nos. 321,680/928 and 321,720/928; the composition on local heating in the presence of promotors of coagulation as described in the specifications appertaining to said prior applications giving directly articles of compact coagulated rubber or the like.

The invention is particularly convenient for the advantageous application of reclaimed or ground rubber, particularly in conjunction with the use of naturally aqueous dispersed rubber or the like, such as normal or concentrated latex.

A composition of matter as aforesaid may be manufactured by emulsifying finely subdivided solid rubber, for instance, reclaimed rubber or finely ground vulcanized rubber, in an aqueous dispersion of an alicyclic compound of the type described.

This emulsion of cyclohexanol, or the like, with the solution of soap or other dispersing agents may be prepared and then introduced as such as it is set forth in Example I or it may be formed during the operation itself adding separately to the reclaimed and/or ground rubber first the cyclohexanol (and/or its homologues) and afterwards the solution of soap and/or other dispersing agents on a suitable mixing, milling and/or kneading machine in one or more portions as exemplified and set forth in Example II to V.

The rubber may be first worked up with a proportion of the organic emulsifier to a condition of intimate admixture, and the mass then brought into the desired condition of aqueous dispersions by incorporation with the dispersing agent for the emulsifier.

Thus, the preliminary disintegration of the rubber may be effected in presence of a small proportion, gradually added, of the organic emulsifier, for example, 10 per cent of cyclohexanol, to the production of a plastic homogeneous mass, and this then brought into the condition of a fluid dispersion by incorporation under agitation with the solution of the dispersing agent for the said emulsifier, for example, by the addition, preferably the gradual addition, of a solution of soap. A soap solution of from 5 to 10 per cent strength has been found to be generally utilizable.

The preliminary stage of disintegration is preferably carried to the point of reduction of the rubber to a high degree of plasticity. For instance, the rubber may be worked on a mixing mill with, as aforesaid, about 10 per cent by weight of cyclohexanol, added in small portions at a time, until a mass of viscous consistency has been produced. According to the degree of particle-reduction of the material during this stage so is the emulsification on incorporation with the soap solution or other dispersing agent more or less rapidly attained, the final material presenting a cream-like appearance.

The emulsion so obtained may be, as already stated, employed alone for the manufacture of articles of rubber or in addition to normal or concentrated latex, which may be vulcanized latex, in such manner that the excess of organic emulsifier, in the above example, cyclohexanol, acts as a plasticizing agent towards the rubber particles in the latex. In alternative, before utilization of the emulsion the organic emulsifier and the dispersing agent therefor, for example, the soap, may be partially recovered in any convenient way, as, for instance, by filtration, centrifugation or deposition, and the agent or agents so recovered used again.

A composition as aforesaid whether or not it be compounded with a naturally aqueous dispersed rubber or the like, such as latex, may comprise rubber compounding ingredients, such as, for example, vulcanizing agents, vulcanizing accelerators, fillers, dyes, softeners, antioxidants and in general all the ingredients usually applied in the rubber industry.

*Example I*

20 kg. of raw rubber and 30 kg. of automobile tire reclaim are worked on a mixing mill for about 50 minutes after which an emulsion of 5 kg. cyclohexanol in 12 kg. of 20% aqueous solution of soap are added. The mass becomes thus transformed in a viscous paste and is then treated in a kneading machine into which 40 kg. of 5% soap solution are poured under stirring until complete dispersion. The dispersion is filtered through a metallic gaze and to the filtrate there are added 0.500 kg. of sulphur, 0.500 kg. zinc oxide, and 75 grams of an ultra-accelerator all finely dispersed in a little water. The mixture thus obtained is employed for the manufacture of rubber goods by repeated dippings, according to Patent No. 1,579,169 (Venosta).

*Example II*

15 kilograms of raw rubber and 50 kilograms of automobile tire reclaim were worked on a mixing mill for about 45 minutes, after which 5 kilograms of cyclohexanol were added in small portions at a time. When the mass had attained a paste-like appearance, 14 kilograms of a 20 per cent soap "solution" in a pasty condition were gradually added. The mass was transferred from the mixing mill to an internal mixer and 45 kilograms of a 5 per cent soap solution were added, the mass being thoroughly agitated until a complete and homogeneous dispersion was obtained. There were then added 0.600 kilograms of sulphur, 1.500 kilograms of calcium sulphate, 0.500 kilograms of zinc oxide and 75 grams of methyldithiocarbamate of zinc. These addenda were introduced together in the form of a paste previously prepared by working them into that form with 1.500 kilograms of water. The fluid mixture was kept in agitation until thoroughly uniform distribution of the components had been effected. The dispersion so produced was found to be suitable for the manufacture of rubber articles of diverse kinds by internal and external moulding and of rubberized fabric by the process set forth in the aforesaid Patent No. 1,717,248.

*Example III*

20 kilograms of automobile tire reclaim were brought into aqueous dispersion precisely in the manner described in the previous example, and to the dispersion so obtained there were then added 60 kilograms of normal latex with which there had been previously incorporated in the form of a paste made with 4 kilograms of water, 0.800 kilograms of sulphur, 5 kilograms of zinc oxide, 2 kilograms of ammonium sulphate and 120 grams of piperidyldithiocarbamate of zinc, the whole being homogenized by continued agitation in the mixer as before.

This composition proved to be applicable to the direct manufacture of rubber articles according to the process set forth in Patent No. 1,750,540.

*Example IV*

20 kilograms of automobile tire reclaim were worked on a roll mixing mill for about 45 minutes, after which 6 kilograms of commercial methylcyclohexanol were added in small portions. When the mass had attained a paste-like appearance, 12 kilograms of a 3 per cent solution of saponine were gradually added. The mass was then transferred from the mixing mill to an internal mixer or kneading machine and 22.5 kilograms of a 1.5 per cent solution of saponine were further added, the whole being thoroughly stirred until a complete dispersion was obtained. To this dispersion there are added 30 kg. of concentrated rubber latex of 60 per cent dry rubber content, 20 kilograms of an aqueous dispersion of rubber substitute (brown factice) and finally a paste consisting of 4 kilograms water, 5 kg. zinc oxide, 1 kg. sulphur and 100 gr. of an ultra-accelerator. The final dispersion, perfectly homogenized through a suitable colloid-mill, or the like apparatus, is employed for coating fibres on a normal spreading machine.

*Example V*

25 kilograms of automobile tire reclaim and 15 kg. of automobile or bicycle inner tube reclaim were worked and mixed with commercial methylcyclohexanol as explained in Example IV. To the pasty mass 25 kilograms of an aqueous dispersion of rubber substitute (brown factice) and finally a dispersion consisting of 4 kilograms water, 5 kilograms zinc oxide, 600 grams sulphur and 60 grams of an ultra-accelerator are added. The final dispersion is then treated and employed as in Example IV or for coating paper for making envelopes, bags for deliquescent chemicals or the like.

It will be appreciated that the above examples, as likewise the specific proportions mentioned of organic emulsifier and of the dispersing agent therefor, are by way of illustration and not in limitation of the invention. The proportion of emulsifier, the nature and concentration of the dispersing agent therefor, the proportion of latex, when such is used, are examples of variable factors which are necessarily dependent upon the nature of the components of a given composition and the purpose to which it is to be put, but are susceptible to determination by simple preliminary trial. So also may the degree of stability of the composition in respect to the maintenance of the condition of uniform dispersion be variable, but for many purposes a more or less temporary degree of stability is no disadvantage, and the condition of homogeneity of dispersion may be restored, if necessary, before use of the emulsion for manufacture by simple agitation of the mixture.

In the following claims, the term "rubber" includes natural raw rubber, synthetic raw rubber, reclaimed rubber, vulcanized rubber, balata, gutta-percha and the like, and any mixtures of these.

I claim:

1. In the art of rubber manufacture, the steps of effecting the disintegration of rubber, forming the mass into a plastic dough with an emulsion of oxygenated alicyclic compounds in which alone rubber is insoluble, emulsifying the dough in water containing a water miscible colloid, and adding rubber compounding ingredients.

2. The process set forth in claim 1, wherein the oxygenated alicyclic compounds are alicyclic alcohols.

3. The process set forth in claim 1, wherein the oxygenated alicyclic compounds are cyclohexanol and its homologues.

4. A process for preparing aqueous dispersions of rubber comprising disintegrating the rubber by mechanical working, adding an emulsion of cyclohexanol in a soap solution to the disintegrated rubber, and continuing the mechanical working of the mass until dispersion of the rubber is complete.

5. A process for preparing aqueous dispersions of rubber comprising disintegrating the rubber by mechanical working, adding cyclohexanol to the mechanical mass in small proportions, continuing mechanical working until the mass attains a paste-like appearance and then adding a soap solution to emulsify the cyclohexanol, and then further subjecting the mass to mechanical working to effect dispersion of the rubber.

6. A process for preparing aqueous dispersions of rubber comprising disintegrating the rubber by mechanical working, adding to the disintegrated rubber an emulsion of a soap solution and an alicyclic alcohol, in which alicyclic alcohol rubber is substantially insoluble, and continuing the mechanical working of the mass until dispersion of the rubber is complete.

7. A process for preparing aqueous dispersions of rubber comprising disintegrating the rubber by mechanical working, adding an alicyclic alcohol, in which rubber is substantially insoluble, to the mass in small proportions, continuing mechanical working until the mass attains a paste-like appearance and then adding a soap solution to emulsify the alicyclic alcohol, and then further subjecting the mass to mechanical working to effect dispersion of the rubber.

MARIO FALDINI.